Patented June 16, 1953

2,642,382

UNITED STATES PATENT OFFICE 2,642,382

REFINING HYDROCARBON OILS

George R. Bond, Jr., Paulsboro, N. J., assignor to Houdry Process Corporation, Wilmington, Del., a corporation of Delaware No Drawing. Application November 24, 1950, Serial No. 197,518

12 Claims. (Cl. 196—44)

The present invention relates to the removal of coloring and sludging impurities from hydrocarbon oils, particularly from such oils boiling in the range of gasoline and naphtha and up to the range of furnace fuel oils; and to the treatment of such oils which have become discolored on standing or otherwise. The invention also includes the removal from gasoline and fuel oils of coloring and sludging impurities and of precursor substances forming such impurities.

Among the objects of the invention is the treatment of such oils to obtain products having more desirable color and improved color stability, and having enhanced resistance to sludging.

Petroleum fractions boiling in the range of fuel oils, for instance fractions boiling within the selected temperature range between about 470 and 900° F., and particularly such fractions which contain nitrogenous impurities, whether or not accompanied by sulfur impurities and/or oxidation products of hydrocarbons such as phenolic compounds, have a tendency on standing to become darker in color and to form sludge. To a lesser extent gasoline and naphtha may become discolored or tend to sludge on long standing. In accordance with the present invention such oils are improved by treatment with aqueous solutions of certain heavy metal chlorides substantially insoluble in the oil, preferably with solutions of ferric chloride. The treatment is effected at room temperature or above using a strong aqueous solution of one or more metallic chlorides, which solution can be quite small in amount with relation to the quantity of oil treated therewith. The aqueous sludge formed by this treatment is separated from the oil raffinate and the latter washed and filtered. The metal chloride or other treating agent can be recovered and repeatedly used in the treatment of further quantities of oil, after suitable fortification of the solution if necessary.

In accordance with a preferred embodiment of the invention ferric chloride or other suitable heavy metal chloride solution is diluted with a substantially saturated solution of an alkaline earth metal chloride or of certain alkali metal chlorides; the most efficient being the chlorides of magnesium, calcium and sodium. By use of the diluting brine as an extender for the active treating solution, better contact between the oil and treating solution is obtained, accompanied by improved facility for separation of the sludge from the oil raffinate and easier recovery of the active treating solution for reuse. Other salt solutions employed as diluents for the active treating agent, such as solutions of potassium chloride, ammonium chloride and sodium bisulfate do not give results comparable with those obtained by the use of the preferred diluent solutions specified.

Other heavy metal salt solutions tried as active treating agents for the oil do not obtain all of the advantages offered in the case of ferric chloride. For instance, chlorides of bismuth and antimony produce oil raffinates of excellent color but are less preferred because of the increased cost of treating agent and the greater difficulty of separation and recovery of the treating agent, due to their greater solubility in the oil and/or in the sludge. Ferric chloride, on the other hand, is relatively cheap, is practically insoluble in the oil, and is quite readily recovered for repeated use. Chlorides of manganese, zirconium, copper and magnesium are markedly less effective for the described treatment than the chlorides of iron, bismuth and antimony. Likewise, nitrates and sulfates of the heavy metals and of other metals tried as substitutes for the chlorides, do not give satisfactory results.

Treatment of the oil with the metal chloride solution can be carried out effectively at ordinary room temperature. Higher temperatures up to the boiling point of the treating solution have also been found satisfactory, but offer no significant advantage. Although a more fluid sludge is usually obtained at the higher temperatures and in some instances increased amounts of nitrogenous materials may be removed from the oil, the color of the oil raffinate appears to be at least as good and often better without elevation of treating temperature.

The ferric chloride solution employed should be quite concentrated, containing in the order of at least about 75% $FeCl_3.6H_2O$ by weight and up to the point of saturation. The treating solution of this concentration can be employed in proportions as low as 0.1% to 3% by volume of the oil; larger amounts of treating solution can be used but offer no particular advantage, when in excess of about 5 to 10% by volume of the oil. The diluting brine solution, if used, may be employed in amount equal to 1 to 10 volumes of the ferric chloride solution, and up to as much as 25 times the volume of the ferric chloride solution without adverse effect; preferably the ferric chloride solution is diluted with 4 to 9 volumes of saturated brine solution containing the preferred salts above described. The aqueous treating solution whether or not diluted by brine is advantageously used in proportions of not less than about 1% by volume of the oil.

As a result of the described treatment of the oil, basic nitrogen impurities present therein are largely removed, being taken up either in the sludge which also contains the colored impurities or in the aqueous phase apparently in the form of hydrochlorides, from which they may be isolated in any suitable manner. Any oil carried over into the sludge may be recovered if desired, in a form substantially free from nitrogen bases by treatment of the sludge with steam at temperatures sufficiently high to effect steam distillation of the oil.

The purified oil raffinate obtained shows an improved stability against discolorization on exposure to sunlight or elevated temperatures (230° F.). A number of samples treated by the invention were exposed to diffused light for almost a year without development of observable sludge and with only insignificant color deterioration.

Example I

The treating solution was prepared by first forming a strong ferric chloride solution (specific gravity 1.50) and admixing the same with 9 parts by volume of a strong calcium chloride solution (specific gravity 1.36), resulting in a mixture containing approximately 235 grams $FeCl_3$ per liter of solution. This treating solution was shaken at room temperature for about a minute with 20 volumes of an aged fuel oil which had a color of about 6 (NPA) with resulting formation of a black sludge. The oil was separated from the sludge and water washed with resulting lightening of the color to 2.75. The treated oil showed excellent storage stability.

Example II

The operation of the preceding example was repeated with the substitution of saturated magnesium chloride solution for the calcium chloride with approximately the same lightening in the color of the oil.

Repetition of the operation with an attempt to substitute potassium chloride solution for dilution of the ferric chloride gave almost no sludge formation and only a relatively small change in color of the oil.

On the other hand strong ferric chloride solution undiluted by any other aqueous salt solution obtains results which are not appreciably different from those obtained in the above examples employing solutions of magnesium chloride and calcium chloride as diluents. The advantages of using the diluted solutions are largely those flowing from better intimacy of contact between the treating solutions and the oil, reducing the required treating time.

On highly nitrogenous stocks, such as those containing 0.1% N or more, larger proportions of $FeCl_3$ should be used to assure removal of the major portion of nitrogen compounds; elevation of temperature as up to 200° F. may also be advantageous.

The method of the present invention is particularly effective in the treatment of gasoline and fuel oils that have already undergone some change on standing, evidenced by color darkening and/or sludging. Apparently such visible changes that have already taken place are accompanied by incipient effects on impurities present in the oil rendering them more amenable to removal by the treatment of the invention.

Example III

To 100 volume of gasoline produced by catalytic cracking of Los Angeles Basin gas oil, which had become purple in color on standing, had a strong mercaptan odor, and contained nitrogen compounds, there was added 1 volume of strong $FeCl_3$ solution (175g. $FeCl_3.6H_2O$ + 45ml. $H_2O$) at room temperature and the mixture shaken one-half hour. Rapid formation of black sludge and disappearance of bad odor resulted. It was decanted from the sludge, washed, and re-distilled to give a clean, pale yellow distillate which did not discolor on standing. From the sludge there was recovered 0.24% (gasoline basis) of nitrogenous oil which turned dark brown on standing.

Similar treatment with concentrated HCl (1 vol.) instead of $FeCl_3$ solution gave no appreciable sludge and yielded a distillate of poorer color and having an odor of mercaptans.

Obviously many modifications and variations of the invention as hereinbefore set forth may be made without departing from the spirit and scope thereof, and therefore only such limitations should be imposed as are indicated in the appended claims.

I claim as my invention:

1. The method of refining liquid hydrocarbon oils which comprises intimately admixing such an oil with an aqueous treating solution composed of a concentrated solution of at least one heavy metal chloride in water extended with a substantially saturated brine solution, thereby forming a sludge containing impurities extracted from the oil, and separating the sludge from the oil raffinate; said heavy metal chlorides being selected from the group consisting of ferric chloride, antimony trichloride and bismuth trichloride, and said brine consisting of a solution in water of at least one chloride from the group consisting of magnesium, calcium and sodium chlorides.

2. The method in accordance with claim 1 wherein said hydrocarbon oil is one boiling in the range of gasoline and naphtha.

3. The method in accordance with claim 1 wherein said hydrocarbon oil is a fuel oil.

4. The method in accordance with claim 1 wherein said hydrocarbon oil is one which has become discolorized by aging.

5. The method of removing coloring and sludging impurities and precursors of such impurities from liquid hydrocarbon oils boiling below about 900° F., which comprises intimately admixing with such an oil an aqueous treating solution which is an admixture of a concentrated aqueous solution of ferric chloride with a substantially saturated aqueous solution of an alkaline earth metal chloride, thereby forming a sludge containing said impurities, and separating the sludge from the oil raffinate.

6. The method according to claim 5 wherein said aqueous treating solution is employed in proportions of 0.1% to less than 10% by volume of the oil.

7. The method in accordance with claim 6 wherein said aqueous treating solution is made up of 4 to 9 volumes of saturated alkaline earth metal chloride solution per volume of ferric chloride solution.

8. The method in accordance with claim 5 wherein said aqueous treating solution is made up of 1 to 10 volumes of alkaline earth metal chloride solution per volume of ferric chloride solution.

9. The method in accordance with claim 5 wherein said hydrocarbon oil is a fuel oil.

10. The method in accordance with claim 5 wherein said hydrocarbon oil is one which has been discolored by aging.

11. The method of improving liquid hydrocarbon oils which comprises treating such an oil in liquid phase with a minor proportion of an aqueous solution comprising a concentrated aqueous ferric chloride solution extended with a concentrated solution of a water soluble chloride from the group consisting of magnesium, calcium and sodium chloride, to thereby form a sludge containing impurities extracted from the oil, and separating the sludge from the oil raffinate.

12. The method in accordance with claim 11 wherein said oil is a fuel oil.

GEORGE R. BOND, Jr.

References Cited in the file of this patent

UNITED STATES PATENTS

| Number | Name | Date |
| --- | --- | --- |
| 1,545,440 | Neumann | July 7, 1925 |
| 2,232,971 | Records et al. | Feb. 25, 1941 |
| 2,394,965 | Engelke | Feb. 12, 1946 |

FOREIGN PATENTS

| Number | Country | Date |
| --- | --- | --- |
| 350,091 | France | Aug. 1, 1905 |
| 276,427 | Great Britain | Aug. 26, 1927 |
| 330,565 | Great Britain | June 10, 1930 |
| 334,833 | Great Britain | Sept. 5, 1930 |
| 40,543 | France | Apr. 19, 1932 |